United States Patent [19]

Trimberger

[11] Patent Number: 5,737,631
[45] Date of Patent: *Apr. 7, 1998

[54] REPROGRAMMABLE INSTRUCTION SET ACCELERATOR

[76] Inventor: Stephen M. Trimberger, 1261 Chateau Dr., San Jose, Calif. 95120

[*] Notice: The term of this patent shall not extend beyond the expiration date of Pat. No. 5,737,631.

[21] Appl. No.: 417,337

[22] Filed: Apr. 5, 1995

[51] Int. Cl.$^6$ .............................. G06F 15/76; G06F 9/30
[52] U.S. Cl. ............................... 395/800.37; 395/376
[58] Field of Search .............................. 395/430, 384, 395/385, 386, 387, 388, 389, 800.37, 376; 326/39

[56] References Cited

U.S. PATENT DOCUMENTS

| Re. 34,363 | 8/1993 | Freeman | 307/465 |
|---|---|---|---|
| 5,109,503 | 4/1992 | Cruickshank et al. | 395/500 |
| 5,301,344 | 4/1994 | Kolchinsky | 395/800 |
| 5,321,845 | 6/1994 | Sawase et al. | 395/800 |
| 5,336,950 | 8/1994 | Popli et al. | 307/465 |
| 5,361,373 | 11/1994 | Gilson | 395/800 |
| 5,386,518 | 1/1995 | Reagle et al. | 395/325 |
| 5,430,734 | 7/1995 | Gilson | 371/22.2 |
| 5,471,593 | 11/1995 | Branigin | 395/375 |
| 5,511,173 | 4/1996 | Yamaura et al. | 395/375 |
| 5,517,628 | 5/1996 | Morrison et al. | 395/375 |
| 5,535,406 | 7/1996 | Kolchinsky | 395/800 |
| 5,537,601 | 7/1996 | Kimura et al. | 395/800 |
| 5,574,930 | 11/1996 | Halverson, Jr. et al. | 395/800 |

OTHER PUBLICATIONS

DeHon, A. "DPGA-Coupled Microprocessors: Commodity ICs for the Early 21st Century", M.I.T. Transit Project, Transit Note #100, from internet site http://www.ai.mit.edu/projects/transit/tn100/tn100.html, Jan. 29, 1994.

French, P. et al. "A Self-Reconfiguring Processor", Proceedings from 1993 Workshop on FPGAs for Custom Computing Machines, IEEE, pp. 50–59, 1993.

(List continued on next page.)

Primary Examiner—Tod R. Swann
Assistant Examiner—Conley B. King, Jr.
Attorney, Agent, or Firm—Mark A. Haynes; Adam H. Tachner; Jeanette S. Harms

[57] ABSTRACT

A microprocessor comprises a defined execution unit coupled to internal buses of the processor for execution of a predefined set of instructions, combined with a programmable execution unit coupled to the internal buses for execution of a programmed instruction providing an on chip reprogrammable instruction set accelerator RISA. The programmable execution unit may be made using a field programmable gate array having a configuration store, and resources for accessing the configuration store to program the programmable execution unit. An instruction register is included in the data processor which holds a current instruction for execution, and is coupled to an instruction data path to supply the instruction to the defined instruction unit and to the programmable instruction unit in parallel, through appropriate decoding resources. A condition code register is coupled to instruction fetching resources, and connected to receive condition codes from both the defined execution unit and from the programmable execution unit. The programmable execution unit includes logic to signal the instruction fetching resources to provide a next instruction when execution of the programmed instruction is done. Resources for accessing the configuration store to program the programmable execution unit are provided, which can utilize the internal buses of the data processor or be completely independent of them.

40 Claims, 3 Drawing Sheets

Iseli, C. et al. "Spyder: A Reconfigurable VLIW Processor using FPGAs", Proceedings from 1993 Workshop on FPGAs for Custom Computing Machines, IEEE, pp. 17–24, 1993.

Casselman, S. "Virtual Computing and The Virtual Computer", Proceedings from 1993 Workshop on FPGAsfro Custom Computing Machines, pp. 43–48, 1993.

Trimberger, S. "A Reprogrammable Gate Array and Applications", Proceedings of the IEEE, pp. 1030–1041, Jul. 1993.

Hennessy J. et al. Computer Architecture: A Quantitative Approach, Chapter 5, Appendix E, 1990.

Box, B., "Field Programmable Gate Array Based Reconfigurable Preprocessor", Apr. 10, 1994; IEEE, pp. 40–48.

DeHon, A., "DPGA–Coupled Microprocessors: Commodity ICs for the Early 21st Century", Apr. 10, 1994, IEEE, pp. 31–39.

Thorson, M., "General–Purpose Coprocessors", E–Mail Transcript, Jul. 3, 1992, 5 pages.

Razdan, R., "PRISC: Programmable Reduced Instruction Set Computers", Doctor of Philosophy Thesis, May 1994, 116 pages.

Razdan, R.; Brace, K; and Smith, M.; "PRISC Software Acceleration Techniques", IEEE, May 1994, pp. 145–149.

Trimberger, S., "Field–Programmable Gate Array Technology", Design Applications, Section 2.6, pp. 68–90, Copyright 1994.

Wirthlin, M., Hutchings, Brad, Gilson, K., "The Nano Processor: a Low Resource Reconfigurable Processor", Apr. 10, 1994, IEEE, pp. 23–30.

REPROGRAMMABLE INSTRUCTION SET ACCELERATOR

BACKGROUND OF THE INVENTION

1. Field of the Invention

The present invention relates to techniques to improve the speed of microprocessors using reprogrammable hardware; and more particularly to the use of reprogrammable execution units in parallel with predefined execution units in a data processing system.

2. Description of Related Art

General purpose computers based on current microprocessors have a single predefined instruction set. The instruction set is devised to improve the speed of a large number of typical applications, given a limited amount of logic with which to implement the instructions. General purpose processors include so called complex instruction set computers (CISC) which have sophisticated instruction sets designed for commercial settings, and reduced instruction set computers (RISC), where the basic instruction set is kept to a minimum that gives good performance over a broad range of applications.

In the interest of good overall performance for a given amount of logic, general purpose processors using both CISC and RISC approaches leave off instructions that may be beneficial for some problems. Therefore, the left off instructions must be replaced with a sequence of the predefined instructions, so that these special problems take longer to solve. Some types of instructions that are commonly left off general purpose processors include floating point arithmetic, graphics manipulations, and bit field extraction used in encryption, data compression and image processing.

If the need for a given instruction is great enough in some applications, some users may benefit from a special purpose instruction set accelerator. The instruction set accelerator intercepts the instructions and interprets them in place of the general purpose processor. This has been done with floating point arithmetic (for example, the Intel 387 class of floating point processors) and for graphics operations. This solution is only cost effective if many or most computer users need the additional speed for those operations so that the cost of developing the special purpose hardware accelerator for a specific instruction is shared. Although most computer users can use fast graphics, very few need, for example, fast encryption. Thus, special purpose instruction set accelerators may not be developed for the encryption algorithm, even though great improvements in performance could be achieved.

Special purpose processors have been built to provide very high speed solutions to compute intensive problems, such as encryption and image processing. These processors replace not a single instruction, but whole programs. Because only a few people need these special processors, they are expensive but provide a huge improvement in performance. Instructions to a special purpose processor are typically sent by commands from the host general purpose processor, however, not as instructions that the special purpose processor intercepts. Thus, special interface software is required to access the special purpose processor.

Computer users are also faced with the prospect of numerous instruction set accelerators and special purpose processors in their computers, one for each special application they may do. This adds to size, weight and expense of computers. Further, even the commonly used special operations are not needed always, so most of the hardware accelerators will be unused at any one time.

An alternative technique for reconfiguring a general purpose processor involves a use of writable microstores. One method of building a general purpose processor implements instructions by emulating them with microcode. Microcode comprises instructions that control flow through a set of functional units in the microprocessor. Each instruction on the general purpose processor is emulated by several microinstructions. The general purpose processor has a microcontroller that reads the microcode from the microstore, and uses the instruction value to determine where in the microstore to execute and what to do to perform the logic for the instruction.

Typically, a manufacturer stores microcode in read only memory. However, some microprogrammed computers have been built with a writable microstore. In these machines, a user can write a program that emulates a new instruction set. However, these systems require an embedded microcontroller, and deal with a fixed set of functional units. Also, the microinstruction fetching technique divides each instruction into a number of instructions, rather than replacing a slow instruction with a fast one. Thus, these systems have limited use for improving performance of systems that need special purpose instructions.

One prior art approach to improving performance of general purpose processors involves the use of field programmable gate array (FPGA) logic configured as a co-processor attached to the same bus as the host processor. See for example U.S. Pat. No. 5,361,373 to Gilson. This approach involves capturing entire sub-routines, detecting when the host CPU enters the captured sub-routine, and then taking over execution of the programmed function in the FPGA hardware. When the function completes, the FPGA returns control to the host CPU itself. However, this approach requires complex coordination with the host CPU, including maintaining CPU state and the like while the field programmable co-processor executes the sub-routine. The cost of overhead of the process, such as maintaining and restoring CPU state via dump and un-dump operations on the CPU, limits application of the field programmable co-processor to relatively complex sub-routines.

Such reprogrammable hardware accelerators, like dedicated special purpose processors before them, are targeted at huge speed improvements in large scale operations. Therefore, their applicability is limited. They tend to be large and complicated, and only help with a limited number of special problems. Further, interfacing to such devices is non-standard, because they do not interpret instructions on the microprocessor bus.

Accordingly, it is desirable to provide a technique for using reprogrammable logic to accelerate special instructions for a general purpose processor which is practical to implement, and provides a significant performance improvement over prior art systems. This will provide the ability to a user to reprogram the host processor such that it includes an instruction set based on defined and programmed instructions optimized for the users particular applications.

SUMMARY OF THE INVENTION

The present invention provides a technique providing a reprogrammable instruction set accelerator (RISA). The RISA can be programmed with reprogrammable logic to do small scale data manipulation and computation, just like the instruction set accelerators currently in use. Furthermore, the RISA can be tightly coupled to instruction and data paths in parallel with the predefined execution units in microprocessors. This provides fast and efficient execution of new instructions and a significant improvement in performance. The RISA provides the capability for users to program instructions that may be difficult to do in the general purpose processor, and not in wide enough use to warrant a hardware accelerator. Further, the reprogrammable instruction set accelerator can be reprogrammed with different instructions at different times, saving space and cost in the computer.

Some examples of the kinds of operations that may be implemented using the reprogrammable instruction set accelerator include the following:

bit rotation/field extraction, used in instruction emulation or encryption or decryption;

on - bit counting;

polynomial evaluation;

spreadsheet resolution, such as an instruction that calculates each cell in the spreadsheet to be resolved;

searching in a document;

spell-checking;

database access routines;

procedure invoke/return operations;

programming language interpreters;

emulation of another processor; and context switching for multi-processing.

The instruction set accelerator may be reprogrammed for each program that runs on the computer, or a manufacturer may select a few instructions and ship them stored with the computer. A program may reprogram the reprogrammable instruction set accelerator several times during the program to speed up different parts of the program. The logic space in the reprogrammable instruction set accelerator may be allocated by the computer system, and instruction sets swapped, using operations similar to overlays, virtual memory or caching.

Accordingly, the present invention can be characterized as a data processor which comprises a defined execution unit coupled to internal buses of the processor for execution of a predefined set of instructions, combined with a programmable execution unit coupled to the internal buses for execution of a programmed instruction. The programmable execution unit may comprise a field programmable gate array having a configuration store, and resources for accessing the configuration store to program the programmable execution unit.

In one aspect of the invention, an instruction register is included in the data processor which holds a current instruction for execution, and is coupled to an instruction data path to supply the instruction to the defined execution unit and to the programmable instruction unit in parallel, through appropriate decoding resources.

The processor may include instruction fetching resources and other logic which are responsive to condition codes. A condition code register is connected to receive condition codes from both the defined execution unit and from the programmable execution unit.

In addition, because the programmable execution unit may be reprogrammed after manufacture, the timing for execution of a programmed instruction may not be well predictable. Thus, the programmable execution unit includes logic to signal the instruction fetching resources to provide a next instruction when execution of the programmed instruction is done.

The programmable execution unit may comprise a configuration store, and resources for accessing the configuration store to program the programmable execution unit are provided, which according to one alternative utilize the internal buses of the data processor. Thus, the programmable execution unit may be reconfigured under control of the defined execution unit. Alternatively, the programmable execution unit may include a configuration port which is independent of the internal buses of the data processing system, which allows access to the configuration store for reprogramming the programmable execution unit through a separate port.

The instructions according to one aspect of the invention will have a pre-specified format, including an opcode field specifying an operation by one of the defined and programmable execution units, and plurality of address fields specifying addresses of operand data and result data. The pre-specified format according to one alternative may include a defined/programmed flag, specifying a defined or programmed instruction. Thus, the decoder will be responsive to the flag to enable or disable the programmable execution unit for the purposes of access to the internal buses and register files on the device. According to another alternative, the pre-specified format may include an immediate data field, such that programmed instructions use the opcode field to identify the instruction as a programmed instruction, and the immediate data field to identify a programmed operation. A third alternative instruction format includes both an opcode for the defined execution unit and an opcode for the programmable execution unit.

Accordingly, the present invention provides a new method for executing a computer program which includes a particular function. The method includes providing a defined instruction execution unit and programmable instruction execution unit in parallel with the defined instruction execution unit. The programmable instruction execution unit is programmed to execute at least a portion of the particular function in response to a programmed instruction. A sequence of instructions is supplied including the defined instructions and the programmed instruction. The defined instructions are executed in the sequence in the defined instruction execution unit and the programmed instruction is executed in the programmable instruction execution unit. The programmable instruction execution unit can be reprogrammed when the user changes from one application to the next using a configuration port for the programmable instruction execution unit.

Thus, the reprogrammable instruction set accelerator may be programmed through internal processor data paths or through separate, dedicated programing paths initiated by an instruction from the general purpose, defined execution unit. Selecting the instructions to emulate can be done manually, by inspecting the instructions or procedures to be executed, and crafting new instructions to implement chosen functionalities. A compiler may be used to automate the addition of programmed instructions to programs it compiles to improve their speed.

Instruction selection may also be done automatically, by profiling the program to see how frequently various procedures or lines of code are used, then replacing them with programmed instructions. This requires software to compile from the programing language to logic gates. This capability now exists with high level synthesis from VHDL, VERILOG or other languages for specifying logic. Given such capability, it is simple to visualize a high level synthesis system that takes a high level programming language such as "C" as input and generates logic for the RISA.

Extraction of instructions may also be done on the fly, by profiling analysis of the instructions to the general purpose processor, then compiling from those instructions to logic in the reprogrammable instruction set accelerator. This profiling may be done before hand, or may be done during execution. In the latter case, the computer learns which instructions are frequently executed and optimizes them as it runs.

Alternatively, many instructions for the RISA can be defined in advance and the compiler may use all or a subset of these additional instructions when compiling. The needed instructions are loaded into the RISA when the program runs.

Accordingly, the present invention provides a technique for improving the performance and flexibility of general purpose processors based on the use of reprogrammable logic techniques. The invention provides greater performance improvements and more flexibility than prior art attempts to optimize instruction execution in general purpose processors.

Other aspects and advantages the present invention can be seen upon review of the drawings, the detailed description and the claims which follow.

DETAILED DESCRIPTION OF THE DRAWINGS

Figure 1:
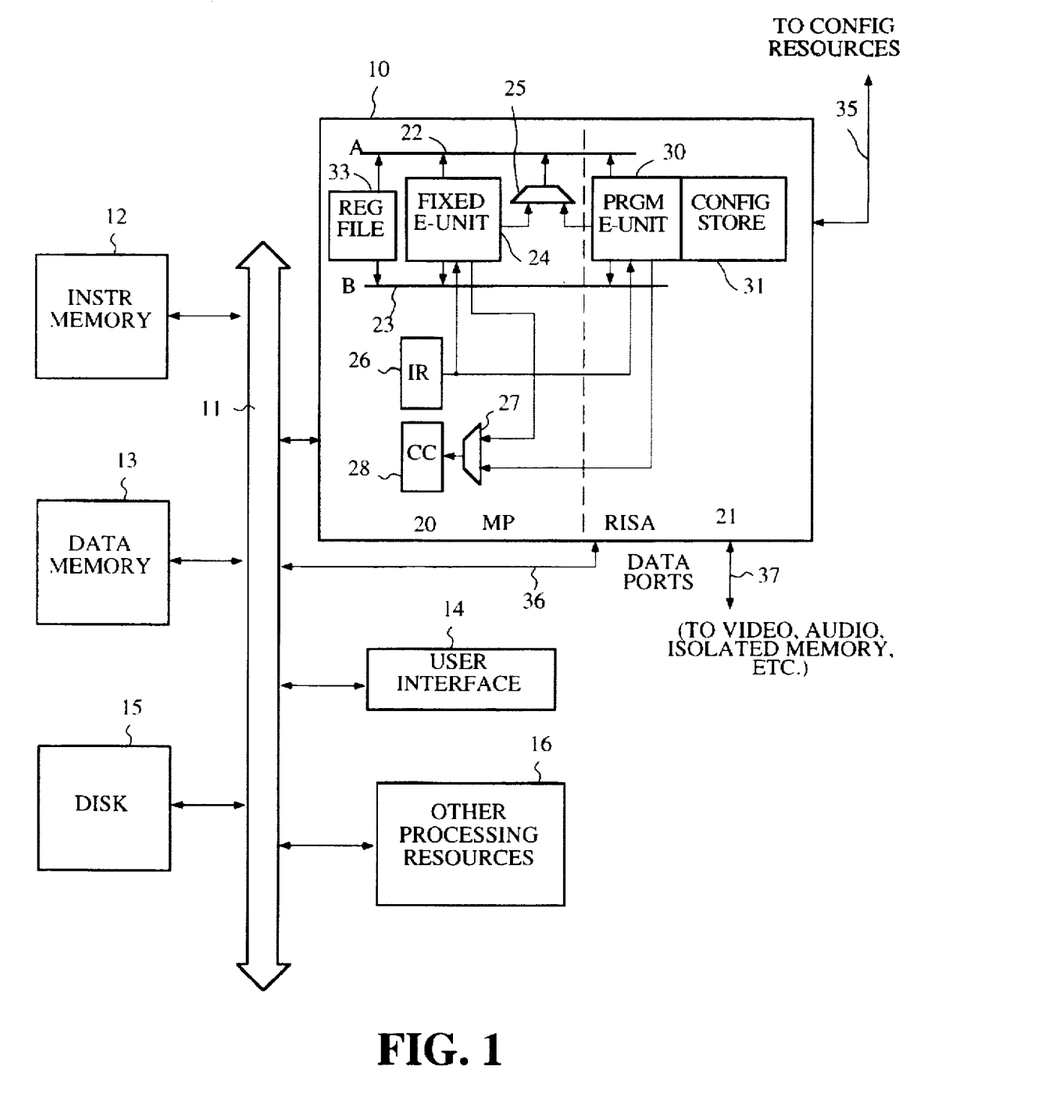
FIG. 1 is a simplified block diagram of data processing system utilizing the reprogrammable instruction set accelerator (RISA) according to the present invention.

A detailed description of the preferred embodiments of the present invention is provided with reference to the figures, in which FIG. 1 illustrates data processing system using the reprogrammable instruction set accelerator according to the present invention. As shown in the figure, the data processing system includes a host CPU generally 10 coupled to the system bus 11. Also coupled to the buses are instruction memory 12, data memory 13, user interface 14, possibly a disk drive 15, and other processing resources generally 16. The host CPU is made up of the basic microprocessor (MP) components generally 20, and a reprogrammable instruction set accelerator (RISA) generally 21. The basic microprocessor includes internal buses 22 and 23, also called buses A and B, respectively. A defined instruction execution unit 24 (or ALU) is coupled to buses 22 and 23, and supplies a result through a multiplexer 25 to bus 22. A register file 33 is accessible across the buses 22 and 23. An instruction path schematically represented by the instruction register IR 26 supplies an instruction to the defined instruction execution unit 24. Also, the defined instruction execution unit 24 generates condition codes which are supplied through multiplexer 27 to a condition code register 28 which is used by the processor as well known in the art in instruction sequencing and the like.

In parallel with the general purpose microprocessor is the reprogrammable instruction set accelerator RISA 21. The RISA 21 comprises a field programmable gate array 30, which includes a configuration store 31. The field programmable gate array 30 is coupled to the internal buses 22 and 23, and supplies a result through multiplexer 25 to bus 22. The instruction path through instruction register 26 supplies an instruction to the field programmable gate array 30 in substantially the same manner and timing as it supplies instructions to the defined execution unit 24. The field programmable gate array 30 also supplies conditions codes through multiplexer 27 to the condition code register 28.

A configuration store 31 is coupled with the field programmable gate array 30. The configuration store 31 may accessible through a dedicated port generally 35, or by means of the internal buses 22 and 23 for dynamically reprogramming in a field programmable gate array 30.

In the embodiment illustrated in FIG. 1, the RISA 21 is implemented using field programmable gate array logic. The field programmable gate array logic may take a variety of forms, such as the dynamically reconfigurable architecture described in our co-pending U.S. patent entitled A PROGRAMMABLE LOGIC DEVICE WHICH STORES MORE THAN ONE CONFIGURATION AND MEANS FOR SWITCHING CONFIGURATIONS, U.S. Pat. No. 5,426,378, issued Jun. 20, 1995, invented by Randy T. Ong, which was owned at the time of invention and is currently owned by the same assignee as the present application, and which is incorporated by reference as if fully set forth herein. Alternative programmable logic structures may be utilized. For instance, the RAM based configuration store of typical FPGA designs may be replaced using reprogrammable non-volatile stores such as EEPROM. Also, the configuration store may be programmable during manufacture rather than dynamically. Thus, the manufacturer may use more permanent programming technology such as, anti-fuses or the like to configure a new instruction into a previously defined instruction set.

As shown in FIG. 1, the field programmable gate array is used as an execution unit which is reprogrammable, and connected in parallel with the defined execution unit 24. The system expects the field programmable gate array 30 to return results in a same manner as the standard defined instruction execution unit. The field programmable gate array 30 in the embodiment shown uses the same write back path as the defined execution unit. However, a separate write back path may be used for the FPGA 30 if desired.

The RISA 21 includes an optional data port or ports 36, 37 dedicated for use by the RISA 30. The data port 36 is coupled to the system memory 12, 13 across bus 11. The data port 37 is coupled to an external data source, such as a video data source, an audio data source or memory isolated from the system bus 11.

The field programmable gate array 30, executes instructions that take an amount of time which is not predictable prior to configuration, and do not match well with the pipeline speed of the fixed execution unit 24. Thus, logic is included to hold the processor during execution of a programmed instruction, and to signal the processor when the programmed instruction is complete.

In addition, one embodiment of the RISA 21 operates in an overlapped fashion with the defined instruction execution unit 24 for some operations, taking advantage of the parallel execution units in the system for greater performance.

Figure 2:
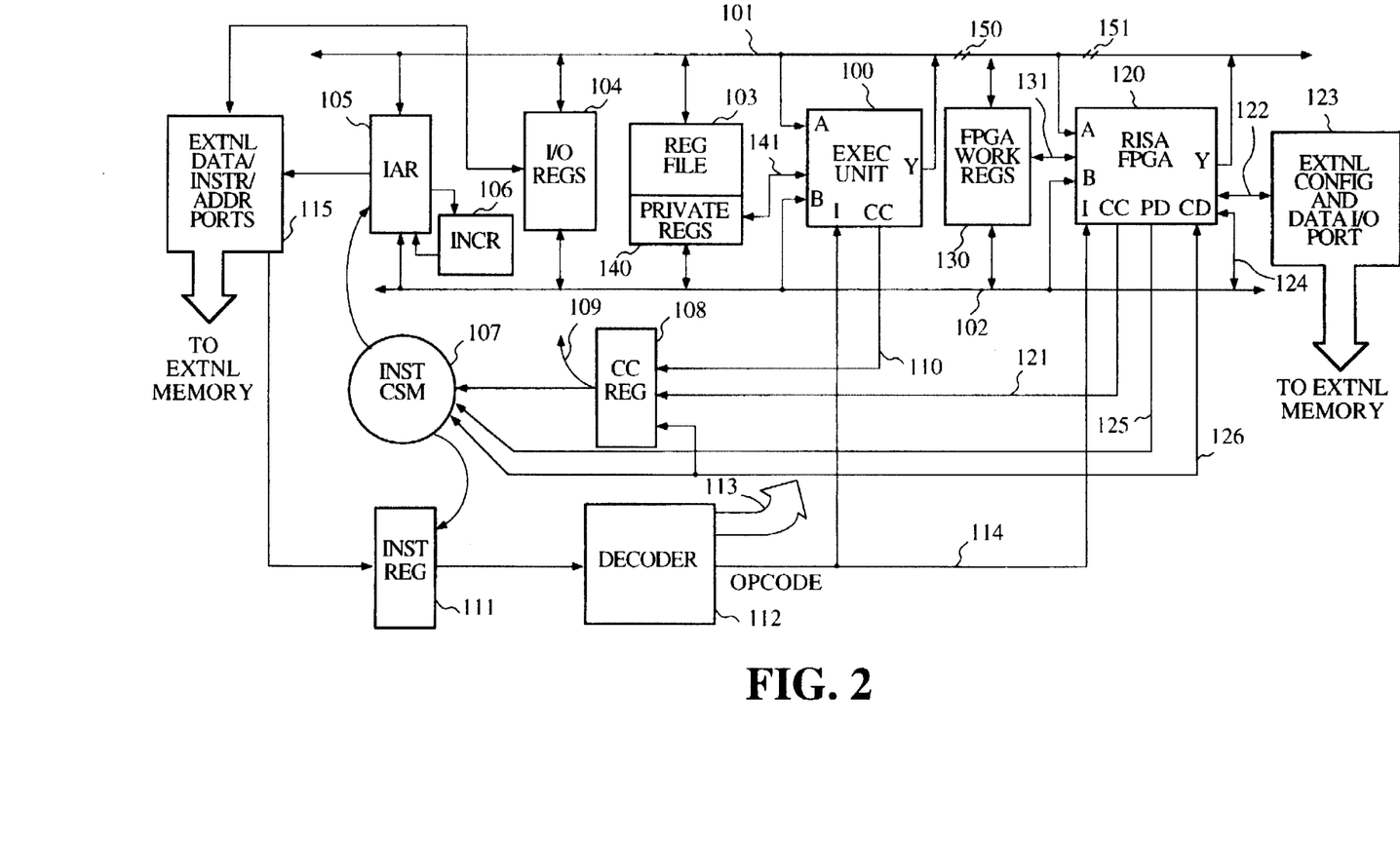
FIG. 2 is a schematic diagram of a integrated circuit microprocessor including a defined execution unit and a reprogrammable execution unit according to the present invention.

FIG. 2 provides a more detailed block diagram of an integrated circuit microprocessor which includes the RISA according to the present invention. Those skilled in the art will recognize the basic components of the microprocessor. Thus the figure is intended to represent wide variety of microprocessor architectures, including complex instruction set processors, reduced instruction set processors, and other data processing architectures.

Thus, the system includes a execution unit 100 which is optimized for a predefined instruction set. The execution unit 100 is coupled to internal buses 101 and 102 for receiving operand data at its ports A and B, and supplying result data on its port Y back to one of the internal buses, e.g. bus 101. A register file 103, and input/output registers 104 are also coupled to the buses 101 and 102, and act as sources for operands, and locations to store result data. The registers accessible by the executing unit 100 include private registers 140 which are dedicated for use by the defined execution unit 100, and not by the programmable execution unit (FPGA RISA 120 described below). In an optional embodiment, the private registers 140 are directly coupled with the defined execution unit 100 as indicated by line 141.

In another embodiment, internal bus 101 is broken into two sections at point 150, thereby allowing independent operation of execution unit 100 and RISA 120. In yet another embodiment, internal bus 101 is broken into two sections at point 151, thereby allowing independent outputs with shared inputs.

Also, coupled to the internal buses 101 and 102 is an instruction address register 105, and other resources in the instruction address fetching path. The instruction address register 105 includes basic incrementing logic 106 for sequencing through a sequence of instruction addresses for an instruction memory off chip. Also, an instruction control state machine 107 is coupled to the instruction address register 105 for managing the instruction stream as known in the art. The instruction control state machine 107 is also coupled to other components on the chip as appropriate.

A condition code register 108 supplies condition codes to the instruction control state machine 107 involved in the instruction sequencing decisions, and also as indicated by arrow 109 to other processing resources in the system that suits the particular implementation. Condition codes are generated on line 110 by the defined execution unit 100 as known in the art.

An instruction register 111 receives instructions generated in response to instruction address register 105. Instructions are supplied from the instruction register 111 to decoder resources 112. The decoder resources 112 supply control signals, generally represented by arrow 113, throughout the device to control accessing of the register files, bus timing, and other functions on the processor. The decoder also generates an opcode on line 114 which is supplied at the instruction input I on the defined execution unit 100.

External data, instruction, and address ports 115 are included as known in the art, for managing flow of data, instructions and addresses into and out of the chip. The external data/instruction/address ports 115 are coupled to the I/O registers 104, the instruction address register 105, and the instruction register 111.

According to the present invention, a reprogrammable instruction set accelerator is included on the chip. Thus, a RISA field programmable gate array (RISA FPGA) 120 is coupled to the internal buses 101 and 102, to receive operand data at ports A and B and supply result data at port Y to and from the buses. The opcode from line 114 is supplied at an instruction port I on the RISA FPGA 120. Condition codes generated by the RISA FPGA 120 are supplied on line 121 to the condition code register 108. These condition codes may use the same spaces in the condition code register 108 as the defined execution unit 100, use separate bits within the same register 108, or use a different register altogether coupled to operate in parallel with the condition code register 108 for the defined instructions.

The RISA FPGA 120 is also connected across line 122 to an external configuration port 123. The external configuration port 123 may take the variety of configurations. For instance, the external configuration port 123 can be implemented as fast DMA port or as a serial port with appropriate control signals for loading a data stream into a configuration store of the FPGA 120 independent of the internal buses 101 and 102. In an alternative, the RISA FPGA 120 is coupled with the internal buses 101 and 102, such as represented by line 124. In this case, configuration of the RISA FPGA 120 is managed by the defined execution unit 100 using the buses 101 and 102 and the I/O registers 104 of the basic architecture, without using additional pins on the chip.

According to the present invention, the RISA FPGA 120 also includes a program done port PD, and a configuration done port CD. The program done port is coupled to logic within the FPGA 120 to generate a signal on line 125, used to indicate when execution of a programmed instruction in the RISA FPGA 120 is completed. This signal is supplied to the instruction control state machine 107 and to other timing resources in the system, to hold the processor while a programmed instruction is executing. Because programmed instructions may require more time to execute than a defined instruction in the optimized execution unit 100, the pipeline must be held to accommodate the longer execution stage. The system may be improved or optimized with additional pipeline stages and the like to improve performance as necessary. Alternatively, the instruction state machine may ignore the PD signal so that the execution unit 100 and the RISA 120 may operate simultaneously.

The signal on the configuration done port CD is used by the RISA FPGA 120 to delineate a configuration process in the RISA FPGA 120. This port is coupled to the condition code register or the instruction control state machine as necessary, as indicated by line 126. The configuration done signal is used during reconfiguration of the RISA FPGA. In one state, the system is held while the RISA FPGA loads configuration data. The other state, the system is signaled that the RISA FPGA is ready for execution. This system may be configured such that during reconfiguration of the RISA FPGA 120, the defined execution unit 100 is capable of continuing execution as long as an opcode for the RISA is not encountered. Alternatively, the system may be held up completely to allow for reconfiguration of the RISA FPGA 120.

In an optional embodiment, special working registers 130 are included which are more closely coupled with the RISA FPGA 120 than the standard register file 103. These working registers are dedicated for use by the RISA FPGA 120 by the decoder 112, or in one alternative, as indicated by line 131, access to them is explicitly controlled by the RISA FPGA 120 as necessary. In an alternative, the registers are accessible under control of both the decoding resources 112 and the FPGA resources 120.

Accordingly, the present invention provides the ability to execute a predefined set of instructions with optimized hardware, such as the execution unit 100, while allowing a user to reconfigure the system to execute a programmed instruction using programmable execution unit resources, such as the RISA FPGA 120.

Figure 3:
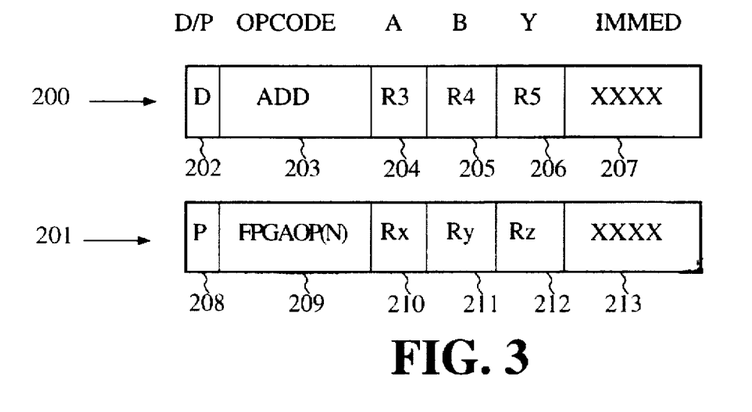
FIG. 3 illustrates one example instruction format for use according to the present invention.
Figure 4:
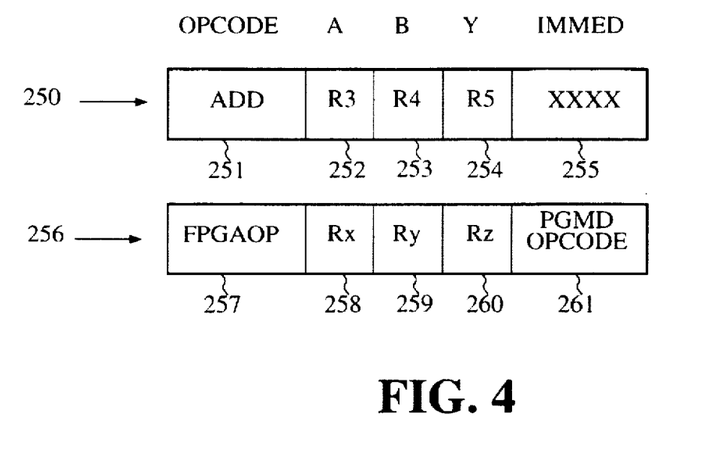
FIG. 4 illustrates an alternative example instruction format for use according to the present invention.
Figure 5:
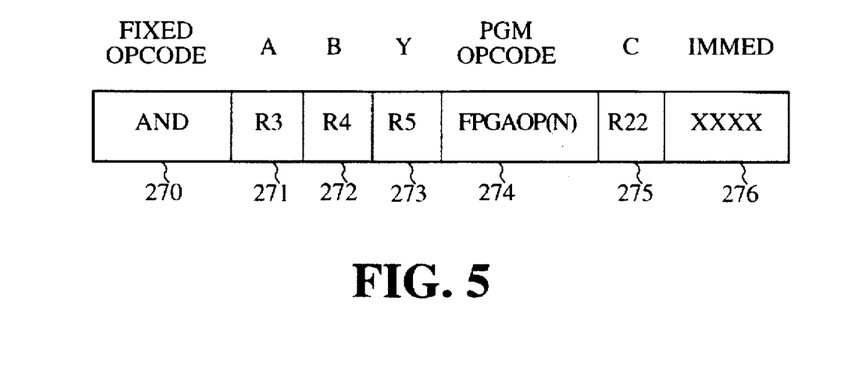
FIG. 5 illustrates another alternative example instruction format for use according to the present invention.

Instruction formats used to accommodate the defined instructions as well as the programmed instructions are illustrated in FIGS. 3, 4, and 5. In FIG. 3, an instruction format, such as used for instructions stored in the instruction register 111 is illustrated for a defined instruction 200, and for a programmed instruction 201. The instruction format includes a defined/programmed (D/P) bit, an opcode, a plurality of addresses, such as source addresses for ports A and B, and a result address for the output Y, and an immediate data field. Thus, for a defined instruction, the D/P field 202 indicates a defined instruction, the opcode field includes a standard opcode such as an "add" instruction in field 203. The source of operand A is identified as register R3 in field 204. The source of operand B is identified as register R4 in field 205. The destination for result Y is specified as register R5 in field 206. Immediate data involved in the operation may or may not be stored in the final field 207.

A programmed instruction is illustrated at 201. In the defined/programmed flag stores the programmed instruction flag in field 208. An opcode defined for the field programmable gate array is included in field 209. There may be a plurality of such opcodes FPGAOP(N) configured for the RISA as suits a particular application. The addresses for operand A and operand B are stored in fields 210 and 211. The address for the result Y is included in field 212. Immediate data involved in the operation, if any, is stored in field 213.

An alternative instruction format is shown in FIG. 4. In FIG. 4, the defined/programmed flag is not used. Rather, the defined instruction 250 includes an opcode field, storing a standard opcode such as "add" in field 251. The addresses for operands A and B are stored in fields 252 and 253. The address of result Y is stored in field 254, and immediate data is stored if necessary in field 255. A programmed instruction is shown at generally reference number 256. It includes a defined opcode FPGAOP in field 257. This signals the decoder that a programmed function is specified in the immediate data field. The addressees for operands A and B are stored in fields in 258 and 259. The address in result Y is stored in field 260. The specific programmed opcode is stored in field 261, which is normally immediate data.

FIG. 5 shows a third alternative instruction format, which includes both a defined instruction opcode field and a programmed instruction opcode field. The format includes a defined opcode field 270, followed by three register address fields 271, 272, and 273 for operands A and B and result Y respectively. Next, a programmed opcode field 274 is included followed by a register address field 275 for operand C. Finally, an immediate data field 276 is included. The decoder 112 is responsive to the instructions in the format of FIG. 5 to select one set of registers for the defined opcode in field 270, such as registers defined in fields 271, 272, and 273 and a separate register for the programmed opcode in field 274, such as the register in field 275. This separate register may reside in the working register file 130. Immediate data in field 276 may or may not be necessary. According to this instruction format, both the defined opcode and the programmed opcode are decoded and executed in parallel, or partially in parallel, for improved performance.

Thus, the decoder 112 in the system of FIG. 2 is configured to respond to instructions in the formats of FIG. 3, FIG. 4, or FIG. 5 as appropriate to manage resources on the microprocessor to execute both the defined instructions and the programmed instructions.

Accordingly, the present invention applies field programmable gate array technology to improving the performance of general purpose processors. By providing a reprogrammable instruction set accelerator on chip, optimized microprocessors can be improved to handle special programmed instructions. The special programmed instructions can implemented by configuring the RISA during manufacture, or dynamically before or during execution of a program. Dynamic reconfiguration is suitable so long as the reconfiguration overhead does not use more time than is saved by including the special programmed function in the instruction sequence. However, the ability to optimize execution of special functions in a high performance microprocessor integrated circuit can have significant impact on performance in many environments, even though the particular instruction added to the system may vary widely from user to user.

The reconfiguration of the RISA can be automated, using tools commonly found in current logic synthesis and compiling technologies. Thus, programs to be executed can be analyzed using sophisticated synthesis and compiling software to identify functions that could be improved by configuration of the FPGA RISA. Once identified, a configuration can be created and stored in memory. At the appropriate time during execution of a program, the configuration can be loaded into the configuration store on chip, and performance of execution of the program vastly improved.

The foregoing description of preferred embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A data processor comprising:
    internal buses for operand and result data;
    a defined execution unit coupled to the internal buses for execution of defined instructions;
    a programmable execution unit coupled to the internal buses for execution of a programmed instruction; and
    a condition code register connected to the programmable execution unit to receive condition codes from the programmable execution unit.

2. The data processor of claim 1, wherein at least one internal bus is divided into a first section and a second section, wherein the first section is coupled to the defined execution unit and not the programmable execution unit, and wherein the second section is coupled to the programmable execution unit and not the defined execution execution unit.

3. The data processor of claim 1, wherein at least one internal bus is divided into two sections, thereby allowing the defined execution unit and the programmable execution unit to share input signals and yet provide independent output signals to the at least one internal bus.

4. The data processor of claim 1, wherein the internal buses include a first bus and a second bus, and the defined execution unit and the programmable execution unit are connected in parallel across the first and second buses.

5. The data processor of claim 1, wherein the programmable execution unit comprises a field programmable gate array.

6. The data processor of claim 1, including:
    an instruction register which holds a current instruction for execution, and an instruction data path supplying the instruction to the defined execution unit and to the programmable execution unit, wherein each said instruction is characterized by a plurality of instruction fields.

7. The data processor of claim 6, wherein the instruction data path includes a decoder.

8. The data processor of claim 6, wherein the instructions have a prespecified format, including an opcode field specifying an operation by one of the defined and programmable execution units.

9. The data processor of claim 8, wherein the prespecified format includes a defined/programmed flag, specifying a defined or a programmed instruction.

10. The data processor of claim 8, wherein the prespecified format includes an immediate data field, and programmed instructions use the immediate data field to identify a programmed operation and the opcode field to identify the instruction as a programmed instruction.

11. The data processor of claim 6, wherein the instructions have a prespecified format, including a defined opcode field for specifying an operation by the defined execution unit, and a programmed opcode field for specifying a programmed operation by the programmable execution unit.

12. The data processor of claim 6, wherein all fields of the instructions are provided to the programmable execution unit.

13. The data processor of claim 1, including:
an instruction fetching resources responsive to condition codes; and
a condition code register, coupled with the instruction fetching resources, and connected to receive condition codes from the defined execution unit and from the programmable execution unit.

14. The data processor of claim 1, including:
an instruction state machine; and
the programmable execution unit includes logic to signal the instruction state machine when execution of a programmed instruction is done.

15. The data processor of claim 1, wherein the programmable execution unit receives programming information through the internal buses.

16. The data processor of claim 1, wherein the programmable execution unit receives programming information through a configuration port independent of the internal buses.

17. The data processor of claim 1, including:
logic which indicates that the programmable execution unit is being configured.

18. The data processor of claim 1, including:
a register file, coupled to the internal buses, accessible by both the defined execution unit and the programmable execution unit.

19. The data processor of claim 1, including a set of registers dedicated for use by the defined execution unit.

20. The data processor of claim 1, including a set of registers dedicated for use by the programmable execution unit.

21. The data processor of claim 1, including a data port coupled to the programmable execution unit.

22. The data processor of claim 21, wherein the data port comprises a source of operand data for the programmable execution unit, independent of the internal buses.

23. The data processor of claim 21, wherein the data port comprises a destination of operand data for the programmable execution unit, independent of the internal buses.

24. A microprocessor, comprising:
internal buses for operand and result data;
a defined execution unit coupled to the internal buses for execution of defined instructions;
a programmable execution unit coupled to the internal buses for execution of a programmed instruction;
resources for accessing the programmable execution unit to define programmed instructions;
an instruction register which holds a current instruction for execution, and an instruction data path from the instruction register, including a decoder supplying control signals in response to instructions to the defined execution unit and to the programmable execution unit;
an instruction state machine, responsive to condition codes, which supply instructions to the instruction register; and
a condition code register, coupled with the instruction fetching resources, and connected to receive condition codes from the defined execution unit and from the programmable execution unit.

25. The microprocessor of claim 24, wherein the programmable execution unit comprises field programmable gate array logic having a configuration store, and the resources for accessing the programmable execution unit include a data path to the configuration store to program the programmable execution unit through the internal buses.

26. The microprocessor of claim 24, wherein the programmable execution unit comprises field programmable gate array logic having a configuration store, and the resources for accessing the programmable execution unit include a configuration port independent of the internal buses for accessing the configuration store to program the programmable execution unit.

27. The microprocessor of claim 24, wherein:
the programmable execution unit includes logic to signal the instruction state machine when execution of a programmed instruction is done.

28. The microprocessor of claim 24, wherein the instructions have a prespecified format, including an opcode field specifying an operation by one of the defined and programmable execution units.

29. The microprocessor of claim 28, wherein the prespecified format includes a defined/programmed flag, specifying a defined or a programmed instruction.

30. The microprocessor of claim 28, wherein the prespecified format includes an immediate data field, and programmed instructions use the immediate data field to identify a programmed operation and the opcode field to identify the instruction as a programmed instruction.

31. The microprocessor of claim 24, wherein the instructions have a prespecified format, including a defined opcode field for specifying an operation by the defined execution unit, and a programmed opcode field for specifying a programmed operation by the programmable execution unit.

32. The microprocessor of claim 24, wherein the internal buses include a first bus and a second bus, and the defined execution unit and the programmable execution unit are connected in parallel across the first and second buses.

33. The microprocessor of claim 24, including:
logic which indicates that the programmable execution unit is being configured.

34. The microprocessor of claim 24, including:
a register file, coupled to the internal buses, accessible by both the defined execution unit and the programmable execution unit.

35. The microprocessor of claim 24, including a set of registers dedicated for use by the defined execution unit.

36. The microprocessor of claim 24, including a set of registers dedicated for use by the programmable execution unit.

37. The microprocessor of claim 24, including a data port coupled to the programmable execution unit comprising a source of operand data for the programmable execution unit, independent of the internal buses.

38. The microprocessor of claim 24, including a data port coupled to the programmable execution unit comprising a destination of operand data for the programmable execution unit, independent of the internal buses.

39. A data processor comprising:

internal buses for operand and result data;

a defined execution unit coupled to the internal buses for execution of defined instructions;

a programmable execution unit coupled to the internal buses for execution of a programmed instruction; and a configuration data bus coupled to the programmable execution unit whereby the programmable execution unit is configured with data received from a source external to the data processor.

40. A microprocessor, comprising:

internal buses for operand and result data;

a defined execution unit coupled to the internal buses for execution of defined instructions;

a programmable execution unit coupled to the internal buses for execution of a programmed instruction;

resources for accessing the programmable execution unit to define programmed instructions;

an instruction register which holds a current instruction for execution, and an instruction data path from the instruction register, including a decoder supplying control signals in response to instructions to the defined execution unit and to the programmable execution unit;

an instruction state machine, responsive to condition codes, which supply instructions to the instruction register;

a condition code register, coupled with the instruction fetching resources, and connected to receive condition codes from the defined execution unit and from the programmable execution unit; and a configuration data bus coupled to the programmable execution unit whereby the programmable execution unit is configured with data received from a source external to the microprocessor.

* * * * *

UNITED STATES PATENT AND TRADEMARK OFFICE
CERTIFICATE OF CORRECTION

PATENT NO. : 5,737,631
DATED : Apr. 7, 1998
INVENTOR(S) : Stephen M. Trimberger

It is certified that error appears in the above-identified patent and that said Letters Patent is hereby corrected as shown below:

On title page, insert item [73] to read as follows:
--Xilinx, Inc., San Jose, Calif.--

Signed and Sealed this

Twenty-ninth Day of August, 2000

Attest:

Q. TODD DICKINSON

*Attesting Officer*  *Director of Patents and Trademarks*